April 18, 1961    W. E. McKINNEY    2,979,847
RELEASING DEVICE FOR SNAGGED FISHING LINES
Filed March 18, 1959

INVENTOR.
WILLIAM E. McKINNEY
BY Alfred R. Fuchs
ATTORNEY

United States Patent Office 2,979,847
Patented Apr. 18, 1961

2,979,847
RELEASING DEVICE FOR SNAGGED FISHING LINES
William E. McKinney, 1123 Grand Ave., St. Joseph, Mo.
Filed Mar. 18, 1959, Ser. No. 800,280
4 Claims. (Cl. 43—17.2)

My invention relates to a releasing device for a snagged fishing line.

More specifically my invention relates to means for releasing a snagged fishing line comprising a heavy metal body that is adapted to be slidably engaged with the fishing line and which is adapted to be manipulated by means of the fishing line so as to exert blows on the hook or other tackle that may be caught on some object, or objects, under the water, whereby the line is snagged.

More specifically my invention comprises a releasing device of the above mentioned character that is adapted to slide down the fishing line until it reaches a position in close proximity to the hook or other apparatus that is secured to the line that is snagged on some debris or other object, and which is then either directly engaged with the hook or other tackle that is caught on such an object or is violently moved about closely adjacent thereto, to exert pulling movements on the hook in such a direction that it would be released, by giving the rod or pole to which the line is attached a few up and down and sidewise jerking movements.

It is a purpose of my invention to provide an apparatus of the above mentioned character that comprises an elongated body portion of heavy metal, such as lead, for example, that has a flat end face and that has a longitudinally extending guide slot therein and which is provided with means for detachably receiving a line, which means holds the line in engagement with the slot, said elongated body portion preferably tapering lengthwise thereof to provide a smaller and a larger end thereon, the larger end in particular being provided with a flat end face, so that it can exert a hammering action, as the metallic member is to be attached to the line with the larger end downward, or positioned on the line in a direction toward the hook or other tackle, that is to be released from whatever may be holding it.

It is a further specific purpose of my invention to provide such a releasing device for a snagged fishing line, that has a pair of transverse grooves in the metallic body thereof that are spaced from the ends thereof to divide the body into a central portion and a pair of end portions, each of these portions having a slot therein that extends longitudinally of the metallic body, the slots being all longitudinally aligned, and to provide means for holding the line in the aligned slots, comprising hooks mounted in the grooves that have a line retaining portion aligning with the slot and an entrance that is out of alignment with the slots.

It is furthermore a purpose of my invention to provide the grooves with flat bottom faces that are so related to the entrances of the hooks that the flat bottom faces of the grooves will direct a line slid along on said flat surface into the entrance of the hook that is located in said groove.

Other objects and advantages of my invention will appear as the description of the drawings proceeds. I desire to have it understood, however, that I do not intend to limit myself to the particular details shown and described, except as defined by the claims.

Figure 1:
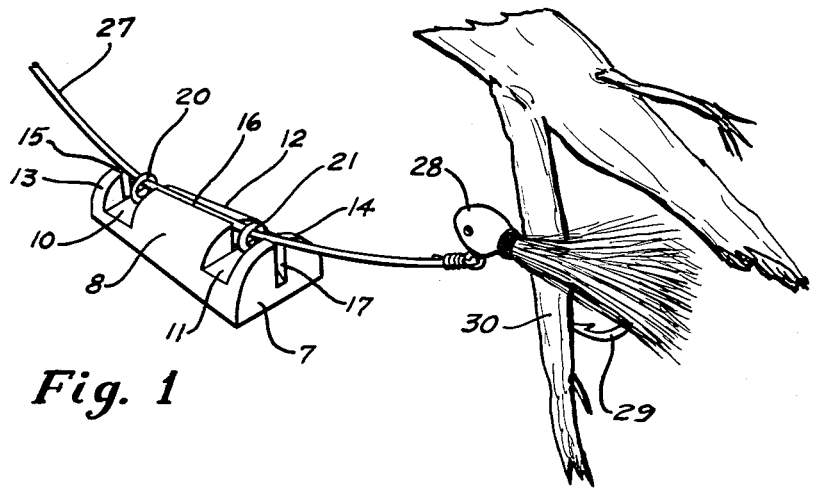
Fig. 1 is a fragmentary perspective view showing the releasing device forming the subject matter of my invention as it is slid down the fishing line into proximity to the hook or similar apparatus that is caught on an object so as to snag the line.
Figure 2:
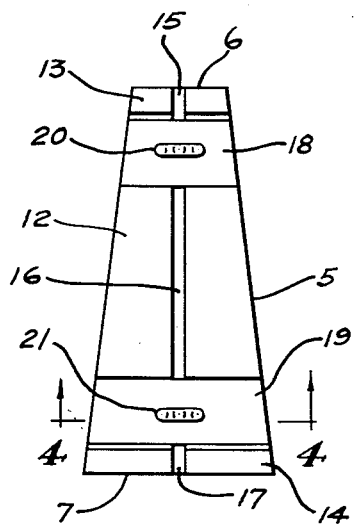
Fig. 2 is a front elevation of my improved releasing device.
Figure 3:
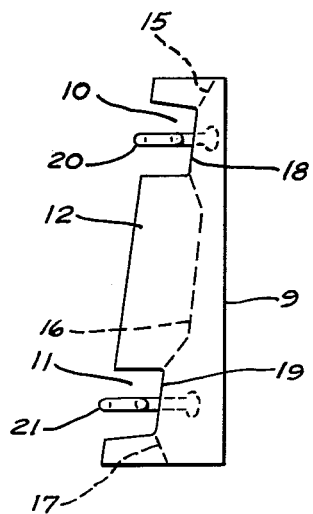
Fig. 3 is a side elevation thereof.

Referring in detail to the drawings, my improved releasing device comprises a metallic body portion 5 that is preferably made of a heavy metal, such as lead. Said body portion is of a tapering character, having a smaller flat end face 6 and a larger flat end face 7. In its preferred form, it is provided with a curved forward side wall portion 8 and a flat rear wall 9. The body portion is further provided with a pair of transversely extending grooves 10 and 11, which are spaced from the ends of the body portion dividing the body portion into a central portion 12 and end portions 13 and 14. The end portion 13 is provided with a longitudinally extending slot 15, the central portion 12 is provided with a longitudinally extending slot 16 and the end portion 14 is provided with a longitudinally extending slot 17, the slots 15, 16 and 17 being all in longitudinal alignment with each other.

The groove 10 is provided with a flat bottom wall 18 and the groove 11 is provided with a flat bottom wall 19. Mounted in each of the grooves is a hook, the hook mounted in the groove 10 being indicated by the numeral 20 and the hook mounted in the groove 11 being indicated by the numeral 21. Said hooks are of identical structure and are related to the grooves in which they are located in the same manner, and accordingly the relationship of one hook to its groove and to the slot in the body portion will only be described herein as the relationship of the other hook thereto is similar.

Figure 4:
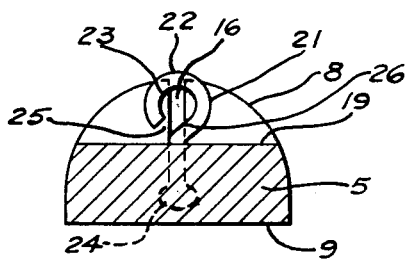
Fig. 4 is a transverse section taken on the line 4—4 of Fig. 2 on an enlarged scale.

Referring to Fig. 4, the hook 21 has an upper curved retaining portion 22 that provides an eye portion 23 that is in longitudinal alignment with the slots 16 and 17. The hook 21 similarly has a retaining portion that defines an eye portion that is similarly related to the slots 15 and 16. The eye portion of the hook is, it will be noted, so located with respect to the slot that the upper transverse portion of the retaining portion 22 of the hook extends slightly below the top edge of the slot 16 and similarly slightly below the top edge of the slot 17, the other hook being similarly related to the slots 15 and 16. Accordingly, when a line is engaged in the eyes of the hooks, it will be held from disengagement from the slots 15, 16 and 17. The hook may be mounted in the body portion 5 in any desired manner, preferably being provided with a head or enlargement 24 thereon that is mounted in the body portion 5, being preferably cast in the body portion. The entrance 25 into the hook is located in such a position relative to the flat bottom face 19 of the groove 11 that if a fishing line is moved in toward the hook from the left as viewed in Fig. 4, it will be guided by the flat face 19 of the groove into engagement with the upwardly inclining surface 26 of the hook adjacent the entrance 25 and into the eye portion. Similarly, the flat bottom face 18 of the groove 10 will guide the line into engagement with the retaining eye portion of the hook 20.

In Fig. 1 the releasing member is shown in engagement with a fishing line 27 as being in the act of sliding down the line toward the lure 28, which is provided with a hook 29 that is snagged on an object, such as a tree branch 30. Upon raising up on the rod or pole to which the line 27 is attached, the weighted body portion 5 of the releasing device will slide down the line with the flat end face 7 forward into engagement with the lure 28. Upon jerking the pole or rod up and down, and sidewise, if necessary, the weight 5 will be caused to jiggle back and forth on the line, and, due to its pounding action and the weight thereof closely adjacent the lure 28, will jerk the hook 29 loose from the object 30 with which it has become entangled. When it is desired to remove my releasing device from the line, all that is necessary is to remove the line from the slots 15 and 17 and move it toward the left as viewed in Fig. 4 out of the entrances 25 of the hooks 20 and 21, whereupon it will be released from the slot 16. While the releasing device is being operated to release a hook or similar apparatus from an object with which it is entangled, the weighted body portion 5 can not become detached from the line because of the relative position of the eye portions 23 of the hooks and the slots 15, 16 and 17. Even if the line is partly out of the slots 15 and 17, as shown in Fig. 1, due to the curvature of the line produced by the weight of the body portion 5 thereon when the line is not drawn tight, the hooks will always hold the line in the slot 16, and as soon as the line is drawn tight the hooks will again guide the line down into the slots 15 and 17 so that the releasing device will be guided in its movement by the cooperative action of the slots 15, 16 and 17.

What I claim is:

1. A releasing device for a snagged fishing line comprising a heavy metal body having flat end faces and having a pair of transverse flat bottomed grooves therein spaced from the ends thereof and opening through opposite sides thereof to divide said body into a central portion and a pair of end portions, each of said portions having a slot therein extending longitudinally of said body, said slots being longitudinally aligned and opening into said grooves, and a hook mounted in each of said grooves having a retaining portion aligning with said slots.

2. A releasing device for a snagged fishing line comprising a heavy metal body having flat end faces and having a pair of wide transverse flat bottomed grooves therein spaced from the ends thereof and opening through opposite sides thereof to divide said body into a central portion and a pair of end portions, each of said portions having a slot of much greater depth than width therein extending longitudinally of said body, said slots being longitudinally aligned and opening into said grooves, and a hook mounted in each of said grooves having a retaining portion aligning with said slots, said hooks extending transversely of said slots and the entrances to said hooks being out of alignment with said slots and adjacent the flat bottoms of said transverse grooves.

3. A releasing device for a snagged fishing line comprising a heavy metal body having flat end faces and having a pair of wide transverse grooves therein spaced from the ends thereof and opening through opposite sides thereof to divide said body into a central portion and a pair of end portions, said grooves having flat bottom walls, each of said portions having a slot therein extending longitudinally of said body, said slots being longitudinally aligned and opening into said grooves, and a hook mounted in each of said grooves having a retaining portion aligning with said slots, said hooks extending transversely of said slots and the entrances to said hooks being out of transverse alignment with said slots and adjacent said flat bottom portions of said grooves.

4. A releasing device for a snagged fishing line comprising a heavy metal body having flat end faces and having a pair of wide transverse grooves therein spaced from the ends thereof and opening through opposite sides thereof to divide said body into a central portion and a pair of end portions, each of said portions having a slot therein extending longitudinally of said body, said slots being longitudinally aligned and opening into said grooves, and a hook mounted in each of said grooves having a retaining portion aligning with said slots, said hooks extending transversely of said slots and the entrances to said hooks being out of transverse alignment with said slots, said grooves being provided with bottom surfaces extending adjacent the entrances of said hooks for guiding a line into said hook entrances.

References Cited in the file of this patent

UNITED STATES PATENTS

| | | |
|---|---|---|
| 2,609,632 | Davis | Sept. 9, 1952 |
| 2,753,647 | Erickson | July 10, 1956 |
| 2,765,567 | Fifer | Oct. 9, 1956 |
| 2,827,730 | Hunt | Mar. 25, 1958 |